United States Patent
Ramorini et al.

(10) Patent No.: US 12,062,984 B2
(45) Date of Patent: Aug. 13, 2024

(54) METHOD OF OPERATING A CONVERTER CIRCUIT, CORRESPONDING CONVERTER CIRCUIT AND DRIVER DEVICE

(71) Applicant: STMicroelectronics S.r.l., Agrate Brianza (IT)

(72) Inventors: Stefano Ramorini, Milan (IT); Giuseppe Calderoni, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 169 days.

(21) Appl. No.: 17/863,828

(22) Filed: Jul. 13, 2022

(65) Prior Publication Data

US 2023/0016168 A1 Jan. 19, 2023

(30) Foreign Application Priority Data

Jul. 14, 2021 (IT) .................. 102021000018548

(51) Int. Cl.
*H02M 3/158* (2006.01)
*G09G 3/3233* (2016.01)
*H02M 1/00* (2006.01)

(52) U.S. Cl.
CPC ........ *H02M 3/1582* (2013.01); *G09G 3/3233* (2013.01); *H02M 1/0009* (2021.05); *G09G 2330/028* (2013.01)

(58) Field of Classification Search
CPC ............. H02M 3/1582; H02M 1/0009; G09G 3/3233; G09G 2330/028
See application file for complete search history.

(56) References Cited

U.S. PATENT DOCUMENTS

| 10,014,778 | B1* | 7/2018 | Wei ..................... H02M 3/1582 |
| 11,581,795 | B2* | 2/2023 | Chen .................... H02M 3/156 |
| 2019/0324063 | A1 | 10/2019 | Baorda et al. |
| 2022/0069715 | A1* | 3/2022 | Karri ................... H02M 1/0003 |
| 2023/0353053 | A1* | 11/2023 | Ramorini ............. H02M 1/007 |

FOREIGN PATENT DOCUMENTS

EP 2336841 A1 6/2011

OTHER PUBLICATIONS

IT Search Report and Written Opinion for priority application, IT 102021000018548, report dated Mar. 23, 2022, 9 pgs.

* cited by examiner

*Primary Examiner* — Adolf D Berhane
(74) *Attorney, Agent, or Firm* — Crowe & Dunlevy LLC (57) ABSTRACT

A first node of converter circuit receives an input, provides an output at a second node, and has a third node coupled by an inductance to ground. A first switch has a current path between the first and third nodes and a second switch has a current path between the third and second nodes. The converter circuit operates in a first state (with the first switch conductive and the second switch non-conductive) and a second state (with the first switch non-conductive and the second switch conductive). Current flowing through the first switch is sensed during the first state to produce a sensing signal indicative of inductance current. The sensing signal is averaged to produce an averaged sensing signal indicative of an average value of the current. The averaged sensing signal is then weighted by a time during which the second switch is conductive to produce a weighted signal.

14 Claims, 8 Drawing Sheets

METHOD OF OPERATING A CONVERTER CIRCUIT, CORRESPONDING CONVERTER CIRCUIT AND DRIVER DEVICE

PRIORITY CLAIM

This application claims the priority benefit of Italian Application for Patent No. 102021000018548, filed on Jul. 14, 2021, the content of which is hereby incorporated by reference in its entirety to the maximum extent allowable by law.

TECHNICAL FIELD

The description relates to current sensing in DC-DC converters and corresponding circuits.

One or more embodiments may be applied to display panel technologies, for instance active-matrix organic light emitting diode (AMOLED) devices.

BACKGROUND

Various power-supply circuits, such as AC-DC or DC-DC switched mode power supplies, are known in the art.

There exist many types of electronic converters, which are mainly divided in isolated and non-isolated converters.

Converters currently referred to as "buck", "boost", "buck-boost", "Ćuk", "SEPIC", and "ZETA" converters are exemplary of non-isolated electronic converters.

Converters currently referred to as "flyback", "forward", "half-bridge", and "full-bridge" converters are exemplary of isolated electronic converters.

These converters are known to the person skilled in the art, as evidenced e.g., by the application note AN513/0393 "Topologies for Switched Mode Power Supplies", L. Wuidart, 1999, by STMicroelectronics (incorporated herein by reference).

DC-DC converters, in particular of the boost-type, can be used in a variety of applications. Depending on the application, in order to provide adequate efficiency and performance levels, the converter circuit is desired to work in different modes (e.g., Continuous-Conduction Mode (CCM), Discontinuous-Conduction Mode (DCM), asynchronous mode, synchronous mode, etc.) and to operate reliably in different scenarios. In such conditions, the design of a DC-DC converter is rather complicated.

For instance, DC-DC converters can be used as display drivers for AMOLED display panels. These may comprise different DC-DC converters configured to generate a differential supply voltage for the display panel.

In such an application scenario, any ripple/transient on the (positive) regulated supply directly affects the display performance, e.g., causing display flickering. This constrains the output regulated voltage to be as flat and smooth as possible.

As a result, panel current measurement can be a key figure of merit of circuits configured to drive AMOLED display panels.

Existing solutions may envisage using a current sense on a high side switch of a boost converter.

Drawbacks of such existing solutions include, e.g.: introduction of additional quiescent current; increased chip area footprint; extra current consumption, possibly leading to lower efficiency, especially in presence of a light load; and introduction of error due to unidirectionality of current measurability, hardly compatible with forced CCM operations of the boost converter.

There is a need in the art to contribute in addressing the drawbacks discussed in the foregoing.

SUMMARY

One or more embodiments may relate to a method. A method of operating a converter circuit may be exemplary of such a method.

One or more embodiments may relate to a corresponding converter circuit.

One or more embodiments may relate to a corresponding drive device configured to drive a load (such as an AMOLED display panel, for instance).

One or more embodiments facilitate measuring panel current by sensing high side (HS) switch current via an inverting buck-boost converter (e.g., on a negative rail of the panel power supply), a sample and hold circuit block and a (e.g., low pass weighted) filter.

One or more embodiments improve accuracy and/or efficiency at light panel current.

One or more embodiments facilitate savings in terms of chip area and current consumption.

One or more embodiments facilitate reducing of quiescent current consumption.

One or more embodiments may provide a tunable solution with relatively easy tunability.

For instance, one or more embodiments can be integrated with a trimming for offset cancellation and for sensitivity.

BRIEF DESCRIPTION OF THE DRAWINGS

One or more embodiments will now be described, by way of non-limiting example only, with reference to the annexed Figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The drawings are in simplified form and are not to precise scale.

Throughout the figures annexed herein, like parts or elements are indicated with like references/numerals and a corresponding description will not be repeated for brevity.

The references used herein are provided merely for convenience and hence do not define the extent of protection or the scope of the embodiments.

Figure 1:
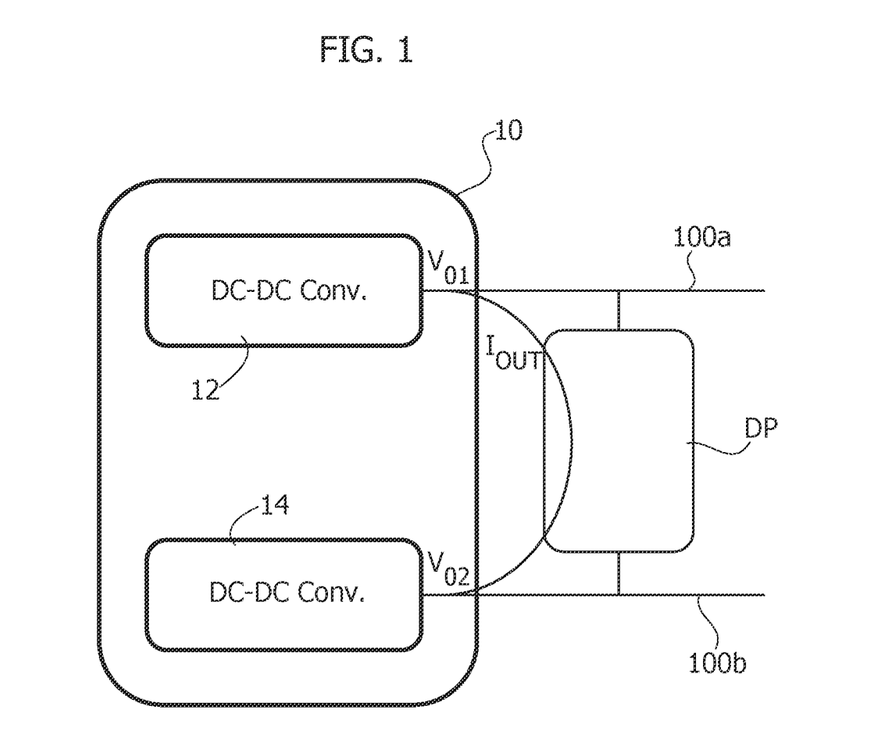
FIG. 1 is an exemplary diagram of a driver device of a display panel.

As exemplified in FIG. 1, driver circuitry 10 is coupled to a display panel DP via a first, e.g., positive, rail 100a and a second, e.g., negative rail, 100b. For instance, an electric current flow $I_{OUT}$ into the panel as a result of being coupled to the rails 100a, 100b. For instance, the drive circuitry 10 configured to drive current flow I in the panel DP.

As exemplified in FIG. 1, the driver 10 comprises: a first DC-DC converter circuit 12, e.g., a boost converter, configured to provide a first voltage level $V_{O1}$ to the first rail 100a, the first DC-DC converter circuit 12 operating in forced CCM mode, and a second DC-DC converter circuit 14, e.g., inverting buck-boost, configured to provide a second voltage level $V_{O2}$ to the second rail 100b.

In one or more embodiments, the second converter 12 can comprise a multi-phase inverting buck boost converter whose operation mode can be varied according to the load current, without causing any flickering to the panel DP.

Figure 2:
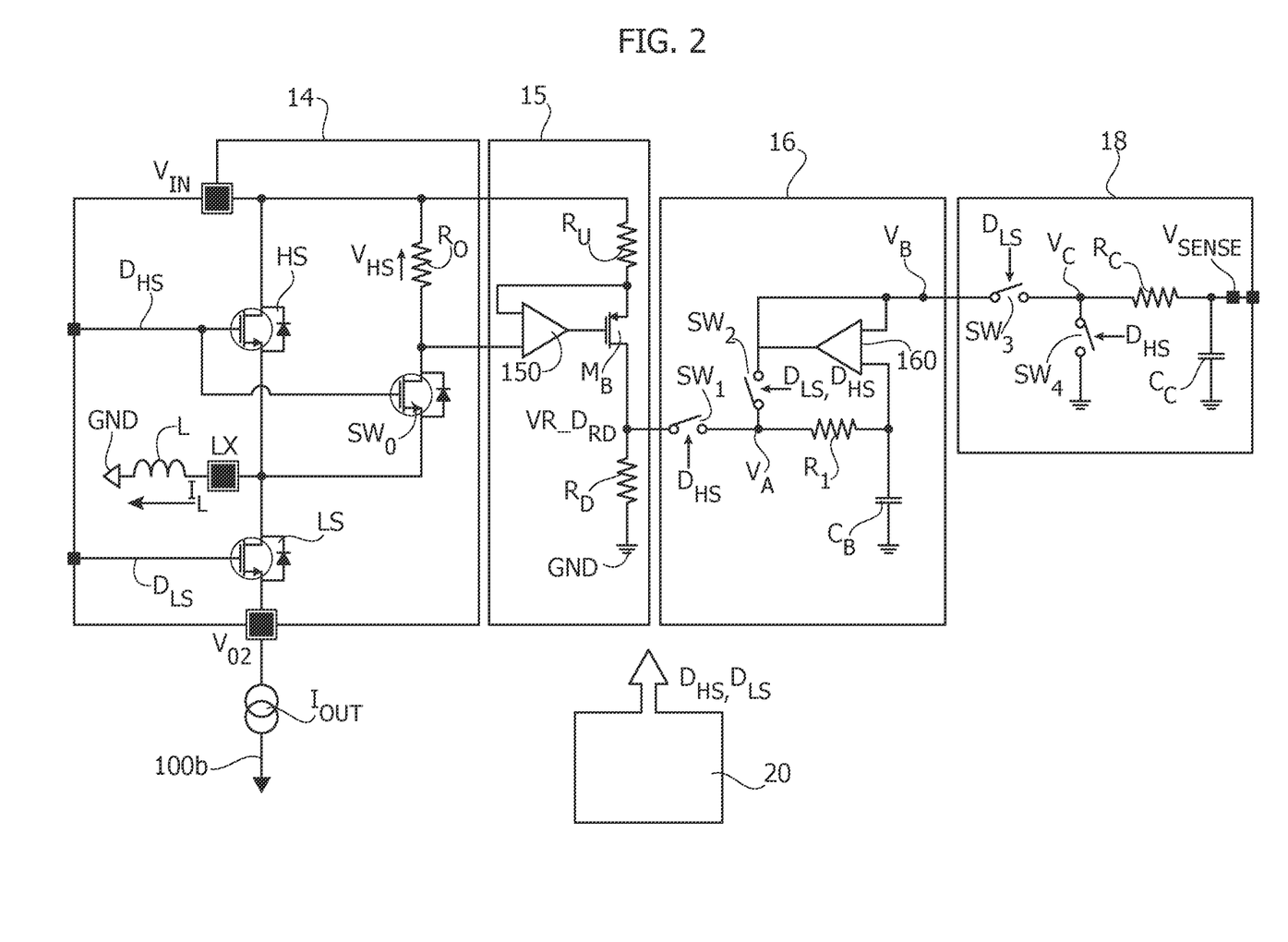
FIG. 2 is an exemplary diagram of a converter circuit as per the present disclosure.

As exemplified in FIG. 2, the inverting buck boost converter 14 comprises: an input node $V_{IN}$ configured to receive a DC input voltage $V_{IN}$ (e.g., provided by a battery), and an output node $V_{O2}$ configured to be coupled to the second rail 100b to supply a regulated voltage to the display panel load DP. A pair of electronic switches HS and LS (with the current path thereof) is coupled (e.g., directly) in series between the output node $V_{O2}$ and the input node $V_{IN}$, wherein an intermediate node between the electronic switches S1 and S2 represents a switching node LX. An inductance L, such as an inductor, is coupled (e.g., directly) between the switching node LX and ground.

Specifically, the pair of switches HS, LS comprises a first, e.g., high-side, electronic switch HS coupled (e.g., directly) between the input node $V_{IN}$ and the switching node LX, and a second, e.g., low-side, electronic switch LS coupled (e.g., directly) between the switching node LX and the (negative) output node $V_{O2}$. In other words, the (high-side) switch HS and the (low-side) switch LS present a half-bridge arrangement.

For example, switches LS and/or HS are transistors, such as Field-Effect Transistors (FETs), such as Metal-Oxide-Semiconductor Field-Effect Transistors (MOSFETs), e.g., n-channel FET, such as NMOS.

As exemplified in FIG. 2, the first and second switches HS, LS have respective control nodes configured to receive, e.g., from a control circuit 20, drive signals $D_{HS}$, $D_{LS}$. Based on a respective control signals $D_{HS}$, $D_{LS}$ having a first, e.g., "1", value, switches HS, LS switch from a first, e.g., open, state to a second, e.g., closed, state, and vice versa. In particular, the control circuit 20 may be configured to provide signals $D_{HS}$, $D_{LS}$ that cyclically vary in time so that, e.g.: the second switch LS (or a similar diode) is open for a time THS during which the first switch HS is closed, and the second switch LS (or a similar diode) is closed for a time TLS during which the first switch HS is open.

This controlled switching facilitates regulating a voltage level at the switching node LX (that is, the voltage at the first switch HS) and a current $I_L$ traversing the inductance L. The current $I_L$ can thus be used to supply the display panel DP.

As exemplified in FIG. 2, the converter 14 further comprises: a further switch $SW_0$ coupled to the control node $D_{HS}$ of the first transistor HS and to the switching node LX, and a sensing resistance $R_0$ coupled to the input node $V_{IN}$ and to the further switch $SW_0$.

As exemplified in FIG. 2, when the first transistors HS is closed, so is the further transistor $SW_0$. As a result, a voltage drop across resistance $R_0$ can be expressed as $V_{R0}=V_{HS}-V_{SW0}$, where $V_{HS}$ is the voltage drop across the first transistor and $V_{SW0}$ is the voltage drop across the further switch $SW_0$.

For instance, a resistance of $SW_0$ can be negligible, so that voltage drop across $R_0$ is substantially equal to that across the first transistor HS, that is $V_{R0} \sim V_{HS}$.

As exemplified in FIG. 2, a current sensing circuit block 15 is coupled to the converter 14.

For instance, the current sensing circuit block 15 comprises: a buffer 150, e.g., an operational amplifier, having a first buffer input node intermediate the sensing resistance R0 and the further switch 15 and a buffer output node coupled to a second buffer input node (via feedback branch FB) and to a buffer transistor $M_B$; a first resistance $R_{UP}$ coupled in parallel to the sensing resistance $R_0$ and to the buffer output node $M_B$; and a second resistance $R_D$ coupled to the buffer output node and ground GND.

As exemplified in FIG. 2, when the first transistor HS is closed, the voltage drop $V_{HS}$ across the sensing resistance $R_0$ is translated, via the buffer 150, across the first transistor $R_{UP}$ of the sensing circuit block 15. As a result, a current $I_{R\_UP}$ which is a function of the current $I_L$ flowing in the inductance L flows into the first transistor $R_{UP}$ and a voltage drop $V_{RD}$ across the second transistor RD can be expressed as:

$$V_{RD} = \begin{cases} \dfrac{V_{HS} R_D}{R_{UP}} = I_L(t) * R_{onHS} \dfrac{R_D}{R_{UP}} & \text{for } D\_HS = 1 \\ 0 & \text{for } D\_HS = 0 \end{cases}$$

where $R_{onHS}$ is an on-resistance of the first transistor and $I_L$ is the current flowing in the inductance L.

A relation between output current $I_{OUT}$ flowing in the display panel DP and inductance current can be expressed as:

$$\overline{I_{OUT}} = \frac{T_{LS}}{T_{SW}} \overline{I_L}$$

As exemplified in FIG. 2, the sensing circuit block 15 is coupled to a sample-and-hold (S&H) circuit block 16. For instance, the S&H circuit 16 comprises: a first switch $SW_1$ coupled to the second resistance $R_D$ of the sensing circuit 15 and to an RC network $R_1$, $C_B$, the first switch $SW_1$ having a respective control node configured to receive a drive signal (e.g., $D_{HS}$) from the control circuit 20 and to be driven to switch accordingly, and a second switch $SW_2$ coupled to the first switch $SW_1$ and to an output node $V_B$, the second switch $SW_2$ having a respective control node configured to receive a drive signal different from the drive signal received by the first switch (e.g., $D_{HS}$) from the control circuit 20 and to be driven to switch accordingly. The circuit 16 further optionally includes a buffer 160 coupled having a first buffer input node coupled to the RC network $R_1$, $C_B$, a second buffer input node coupled to the output node $V_B$ and a buffer output node coupled to the second switch $SW_2$.

Figure 3A:
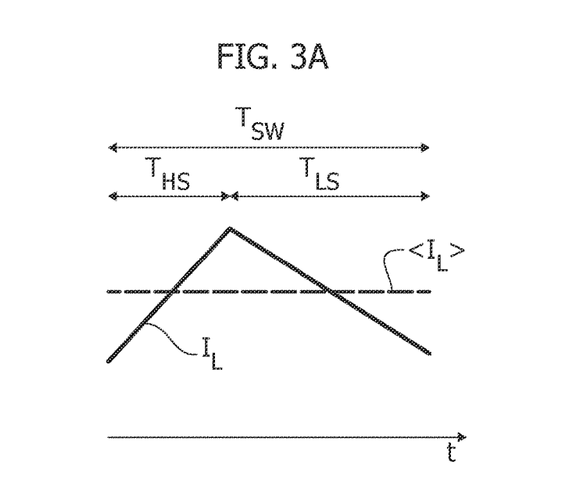
FIGS. 3A, 3B and 3C are exemplary time diagrams of signals in the converter circuit of FIG. 2.
Figure 3B:
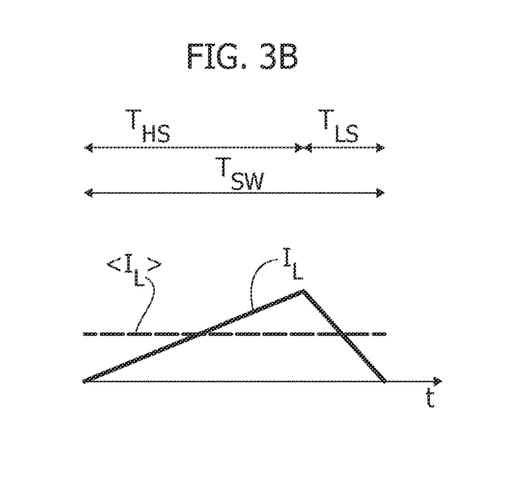
Figure 3C:
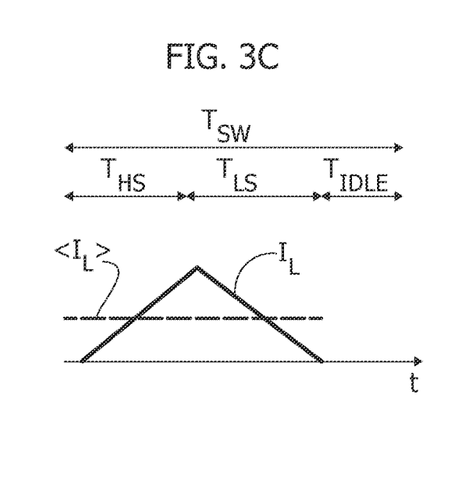

As exemplified in FIG. 3, the current $I_L$ flowing in the inductance L varies in time based on the time in which the first HS or the second LS transistors of the half-bridge arrangement HS, LS are turned on with respect to a total periodical switching time $T_{SW}$.

For instance: as exemplified in FIGS. 3A, the control circuit 20 may be configured to provide signals $D_{HS}$, $D_{LS}$ according to a so-called CCM mode, known per se. Alternatively, as exemplified in FIG. 3B, the control circuit 20 may be configured to provide signals $D_{HS}$, $D_{LS}$ according to a so-called critical mode, which is at a boundary between CCM and DCM operation, known per se. Still further, as exemplified in FIG. 3C, the control circuit 20 may be configured to provide signals $D_{HS}$, $D_{LS}$ according to a so-called (deep) DCM mode, known per se, comprising an idle phase, lasting a time interval $T_{IDLE}$, in which both the first HS and the second LS transistors are in a same "open" state.

As exemplified in FIGS. 3A, 3B, 3C, independently of the control method used to drive switches, a same average value $<I_L>$ of the current $I_L$ can be obtained by calculating the average value $<I_L>$ during the first time-interval $T_{LS}$ in which the low-side transistor LS is on or during the second time interval $T_{HS}$ in which the high-side transistor HS is on (e.g., as long as integration is performed for a corresponding time interval).

Figure 4:
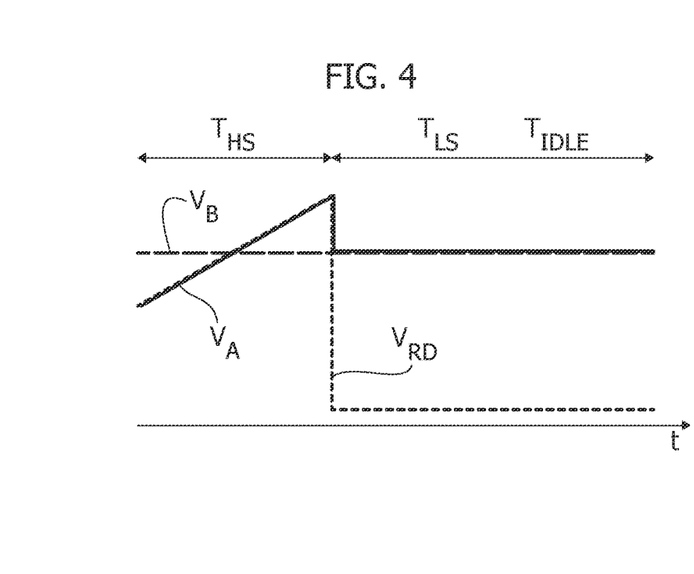
FIGS. 4 and 5 are exemplary time diagrams of further signals in one or more embodiments.

FIG. 4 is exemplary of time diagrams of signals at respective nodes $V_{RD}$, $V_A$ and $V_B$ of the S&H circuit 16 exemplified in FIG. 2.

As exemplified in FIGS. 2 and 4, the S&H circuit 16 is operated to perform: during a first time-interval $T_{HS}$, charging the capacitor $C_B$ in the RC circuit of the S&H circuit 16, so that after several switching periods $T_{SW}$ an average value may be sensed; and during the remaining time of a switching period $T_{SW}$, keeping this average value stored in the capacitor $C_B$, e.g., via low impedance of the buffer 160, and providing it to the output node $V_B$.

For instance, obtaining a sense signal $V_{SENSE}$ indicative of the current $I_{OUT}$ flowing in the display panel DP comprises weighting the average value of the inductive current $<I_L>$. This sense signal $V_{SENSE}$ can be used in a number of ways. For example, consider the efficiency of a DC-DC converter which is a ratio of its power output to a sum of its power output and power loss. This power loss is directly linked to the operation of transistors HS and LS. There are two types of loss in question: ohmic loss and dynamic loss. According to the technology and topology of the DC-DC converter, there exists a current with respect to which it may be preferable to change the size of the HS and/or LS transistors. For example, if the load is high, then very conductive transistor is preferred; on the other hand, if the load is low then a smaller transistor could be used. To accomplish this level of control, each of the HS and LS transistors is typically implemented using multiple devices in parallel that are selectively actuated based on need. By comparing the sense signal $V_{SENSE}$ to a plurality of references, it is possible to make a determination of the need in a digital operating mode and drive on/off the proper number of devices for the HS and LS transistors to improve efficiency.

It is also possible to connect multiple DC-DC converters in parallel to drive a load. These converters may be selectively actuated based on load need. Use of the sense signal $V_{SENSE}$ can be made for controlling selective actuation of DC-DC converters.

The sense signal $V_{SENSE}$ can also be used reduce quiescent current consumption and improve efficiency in light load conditions. The quiescence can be adjusted (increased or decreased) to be more efficient based on the sensed output current.

Additionally, the sense signal $V_{SENSE}$ can used as a control input in connection with making decisions as to switching between different control loops for DC-DC converter operation (for example, when changing among and between pulse width modulation (PWM) and pulse frequency modulation (PFM) operation).

As exemplified in FIG. 2, a weighting circuit 18 is coupled to the S&H circuit 16. The weighting circuit 18 comprises: a third switch $SW_3$ coupled to the output node $V_B$ of the S&H circuit 16 and to a further RC network $R_C$, $C_C$. The third switch $SW_3$ has a respective control node configured to receive a drive signal (e.g., $D_{LS}$) from the control circuit 20 and to be driven to switch accordingly. A fourth switch $SW_4$ is coupled to the second switch $SW_1$ and to an output node $V_{SENSE}$. The fourth switch $SW_4$ has a respective control node configured to receive a drive signal different from the drive signal received by the first switch from the control circuit 20 and to be driven to switch accordingly for a certain time interval (e.g., $T_{LS}$ logically OR'd with $T_{IDLE}$).

Figure 5:
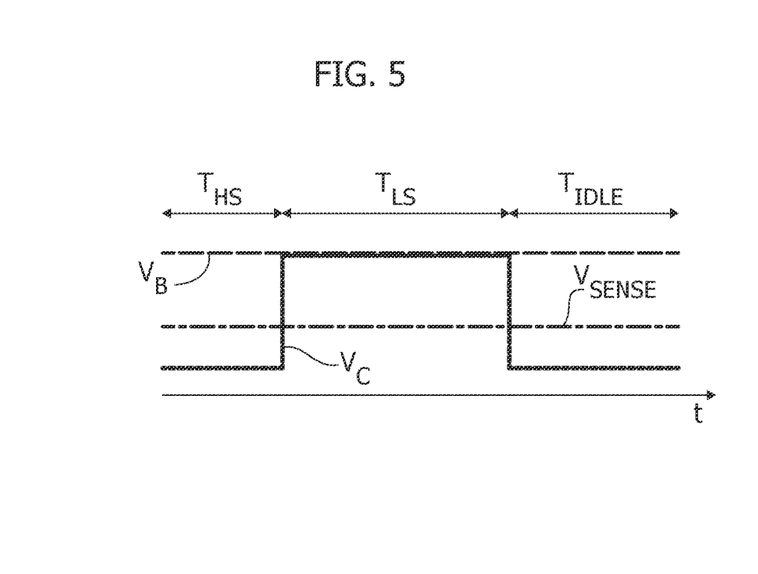

FIG. 5 is exemplary of time diagrams of signals at respective nodes $V_B$, $V_C$ and $V_{SENSE}$ of the weighting circuit 18 exemplified in FIG. 2.

As exemplified in FIGS. 5 and 2, the weighting circuit 18 is operated such that: during a first time-interval (e.g., $T_{LS}$), the third switch $SW_3$ is closed and receives the voltage VB indicative of the average current $<I_L>$, and during the remaining time (e.g., $T_{HS}$ logically OR'd with $T_{IDLE}$) of switching period $T_{SW}$, the fourth switch $SW_4$ is closed and forces node $V_C$ to ground.

In this way, the RC filter $R_C$, $C_C$ sees the same thing as the output node $V_{O2}$ of the converter 14, in terms of average value, providing a corresponding output value $V_{SENSE}$, which can be expressed as:

$$V_{SENSE} = <V_C> = (R_D/R_{UP})*(R_{onHS})*<I_L>*T_{LS}/T_{SW}$$

Figure 6:
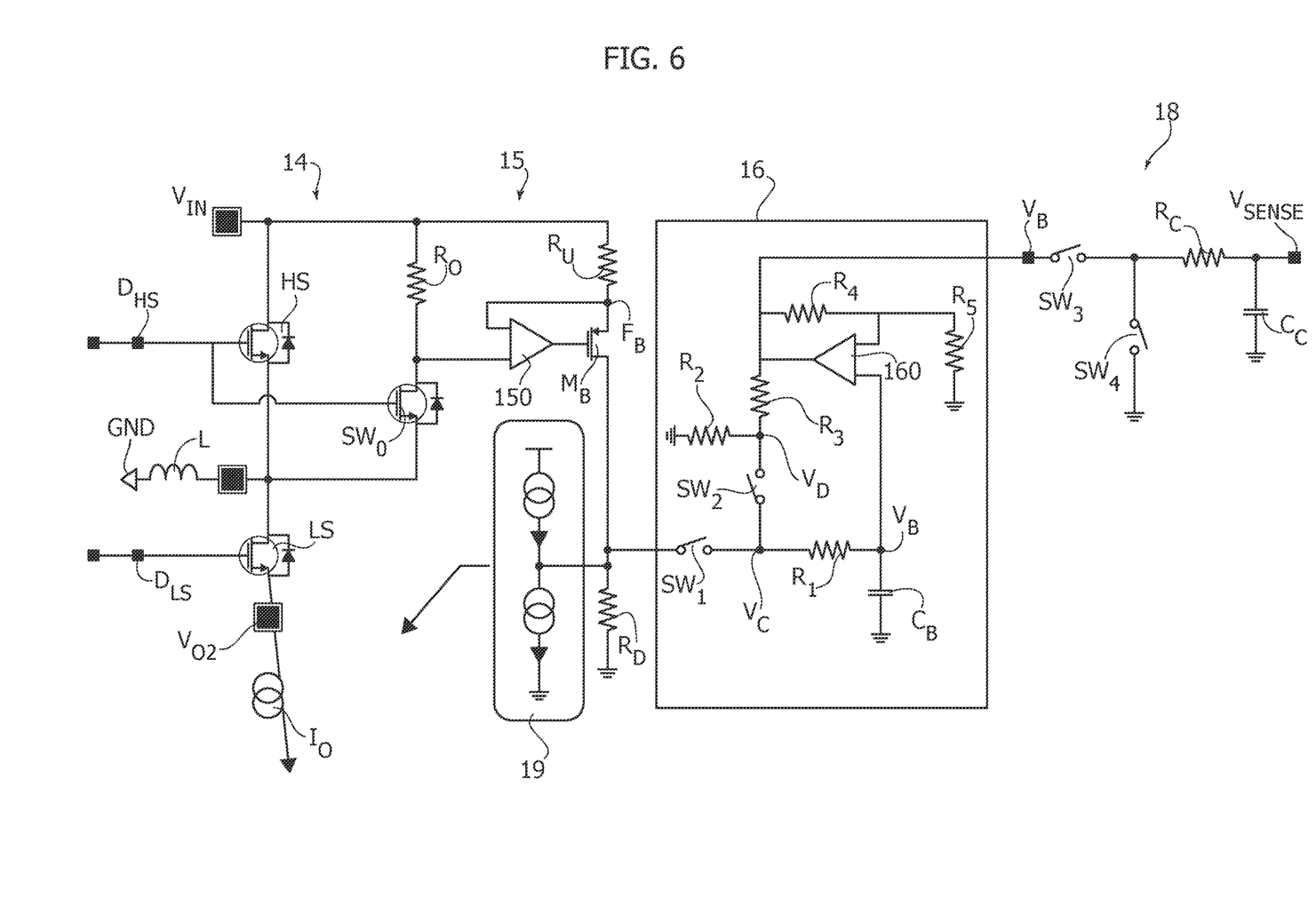
FIG. 6 is an exemplary diagram of a converter circuit as per the present disclosure.

As exemplified in FIG. 6, sensitivity and offset can be tuned, for instance, via: a trimming circuit 19 coupled to the second resistance $R_D$ of the sensing circuit 15, the trimming circuit comprising current generators configured to compensate possible DC errors introduced by the buffer 150; and a set of resistances, e.g., $R_2$, $R_3$ coupled to the second switch and to the output of the buffer 160 and $R_4$, $R_5$ coupled across the buffer input and output nodes, are configured to tune gain in the S&H circuit 16, facilitating maximization of output voltage range and facilitating reducing any integration error introduced by the RC filter $R_1$, $C_B$.

As exemplified in FIG. 6, particularly when non-zero idle time $T_{IDLE}$ is present, the third $SW_3$ and fourth $SW_4$ switches in the weighting circuit 18 switch in response to being driven by a control signal during the idle time $T_{IDLE}$. For instance, the third switch $SW_3$ may be configured to be open during the idle phase $T_{IDLE}$ while the second $SW_2$ and fourth $SW_4$ switches can be closed during the idle phase $T_{IDLE}$.

In one or more embodiments, performance of the sensing circuit 15 may be affected by non-idealities, such as, for instance: finite bandwidth, representing a non-ideality in terms of dynamic range of the circuit 15, and non-zero DC error, representing a second-order issue which may be neglected.

As known, bandwidth of a circuit is indicative of its capability to "follow" a signal during transient evolutions thereof. Limited bandwidth may lead to, for instance, voltage at the feedback branch FB of the sensing circuit 15 diverging from an expected, ideal, behavior in time. As a result, this error propagates, via the voltage $V_{R\_D}$, from the sensing circuit 15 to the S&H circuit 16 and the weighting circuit 18 so that the sensed voltage $V_{SENSE}$ may be affected by a variable offset, e.g., varying as a function of corner temperature and load conditions.

Figure 7:
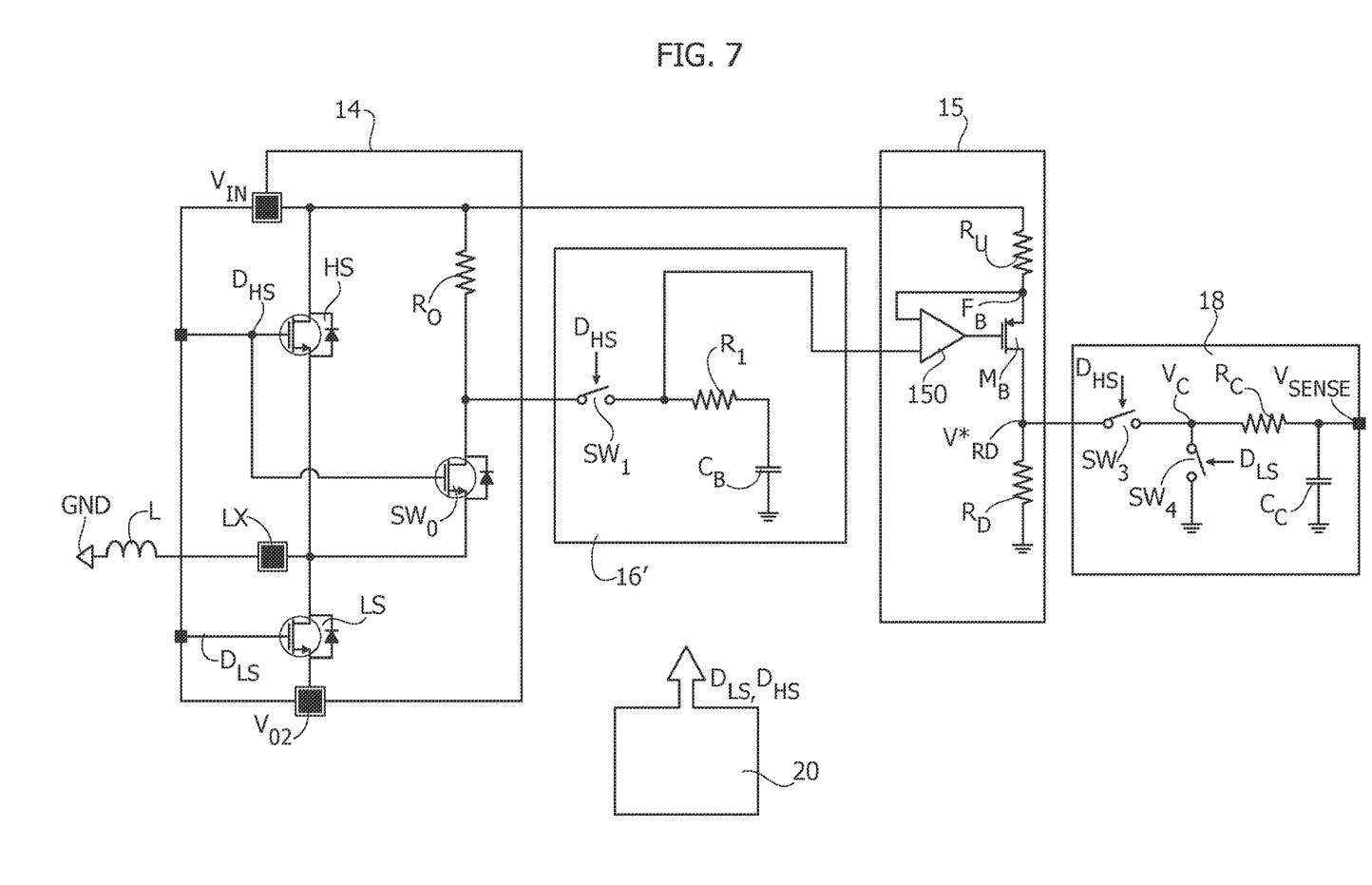
FIG. 7 is an exemplary diagram of alternative embodiments of the converter circuits as per the present disclosure.

FIG. 7 shows an alternative embodiment taking into account these non-idealities.

As exemplified in FIG. 7, this alternative embodiment arranges a S&H circuit 16' interposed the converter circuit 14 and the sensing circuit 15, with the latter coupled to the weighting circuit 18.

As exemplified in FIG. 7, the S&H circuit 16' may comprise the RC network $R_1$, $C_B$ that is selectively couplable, via the first switch $SW_1$, intermediate the sensing resistance R0 and the further transistor $SW_0$ of the converter 14.

For instance: during the first time-interval $T_{HS}$ an instantaneous current value $I_L$ of the current flowing in the sensing resistance $R_0$ is accumulated and "averaged"<$I_L$> in the capacitance $C_B$ of the RC filter $R_1$, $C_B$ of the S&H circuit 16'; and during the remaining portion of the switching time $T_{SW}$, the buffer 150 "copies" this average value <$I_L$>.

As a result, the buffer 150 is subject to smaller dynamic variations of the input signal, resulting in reduced impact of bandwidth non-idealities.

Figure 8:
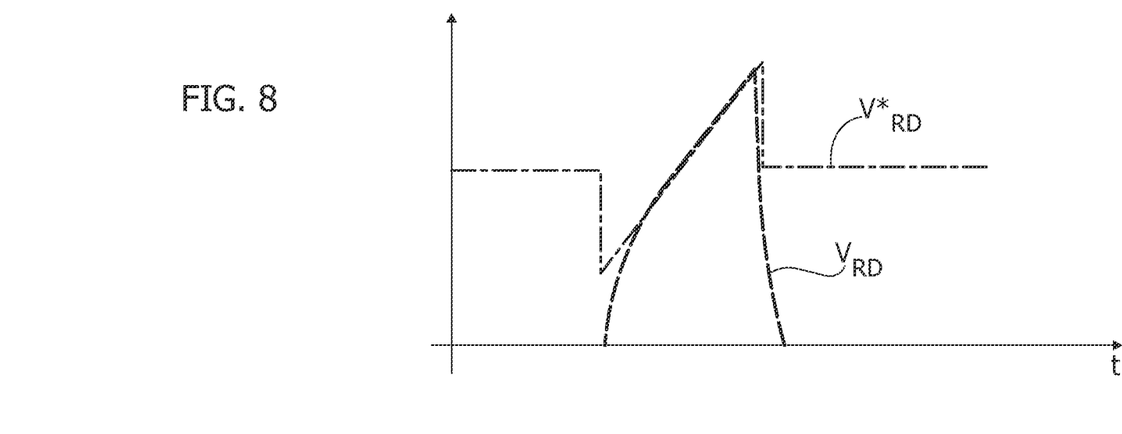
FIGS. 8 and 9 are exemplary time diagrams of signals in the alternative embodiment of FIG. 7.
Figure 9:
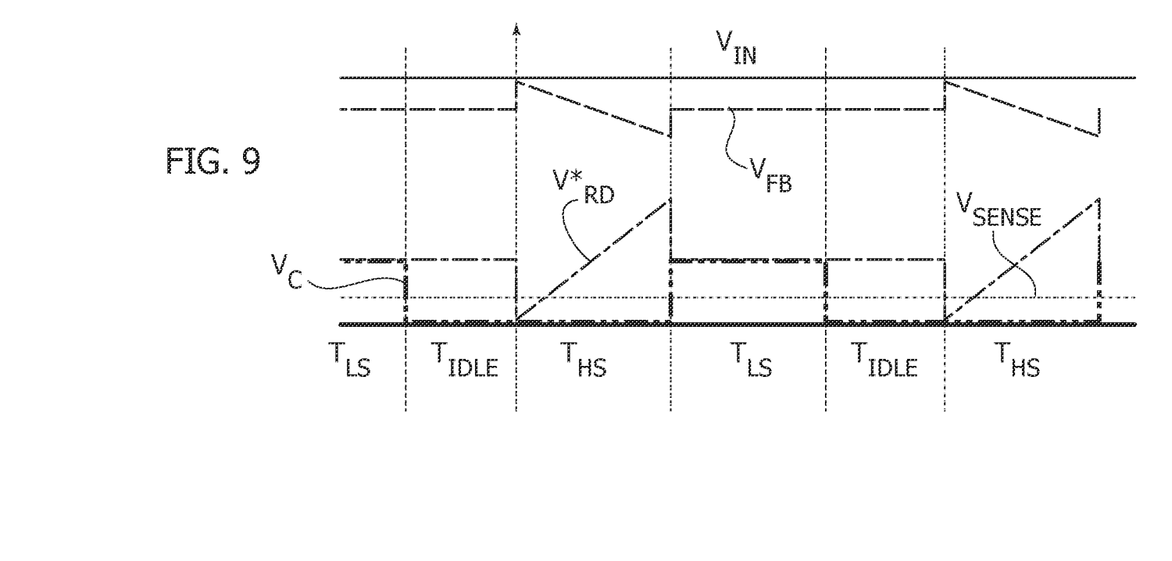

As exemplified in FIG. 9, using an arrangement as exemplified in FIG. 8 may produce a voltage signal $V_{RD}$* across the second resistance $R_D$ of the sensing circuit 15 more closely representing rapid changes of current values with respect to the same signal $V_{RD}$ obtained with the arrangement as exemplified in FIG. 2.

FIG. 9 is exemplary of time diagrams of signals at respective nodes $V_{RD}$, $V_C$, $V_{FB}$ and $V_{SENSE}$ of the circuit arrangement exemplified in FIG. 7 in an exemplary case in which the control circuit 20 is configured to drive the pair of switches HS, LS of the converter 10 using deep DCM mode. It is noted that same signal diagrams, except for the absence of the phase lasting $T_{IDLE}$, can be present when the control circuit 20 is configured to operate the converter 14 according to CCM or DCM or virtually any other operating mode known per se.

With respect to the embodiment exemplified in FIG. 2, the alternative embodiment exemplified in FIG. 7 mainly uses passive components/switches, facilitating to size bandwidth of the buffer 150 according to a ripple signal of the current $I_L$.

Figure 10:
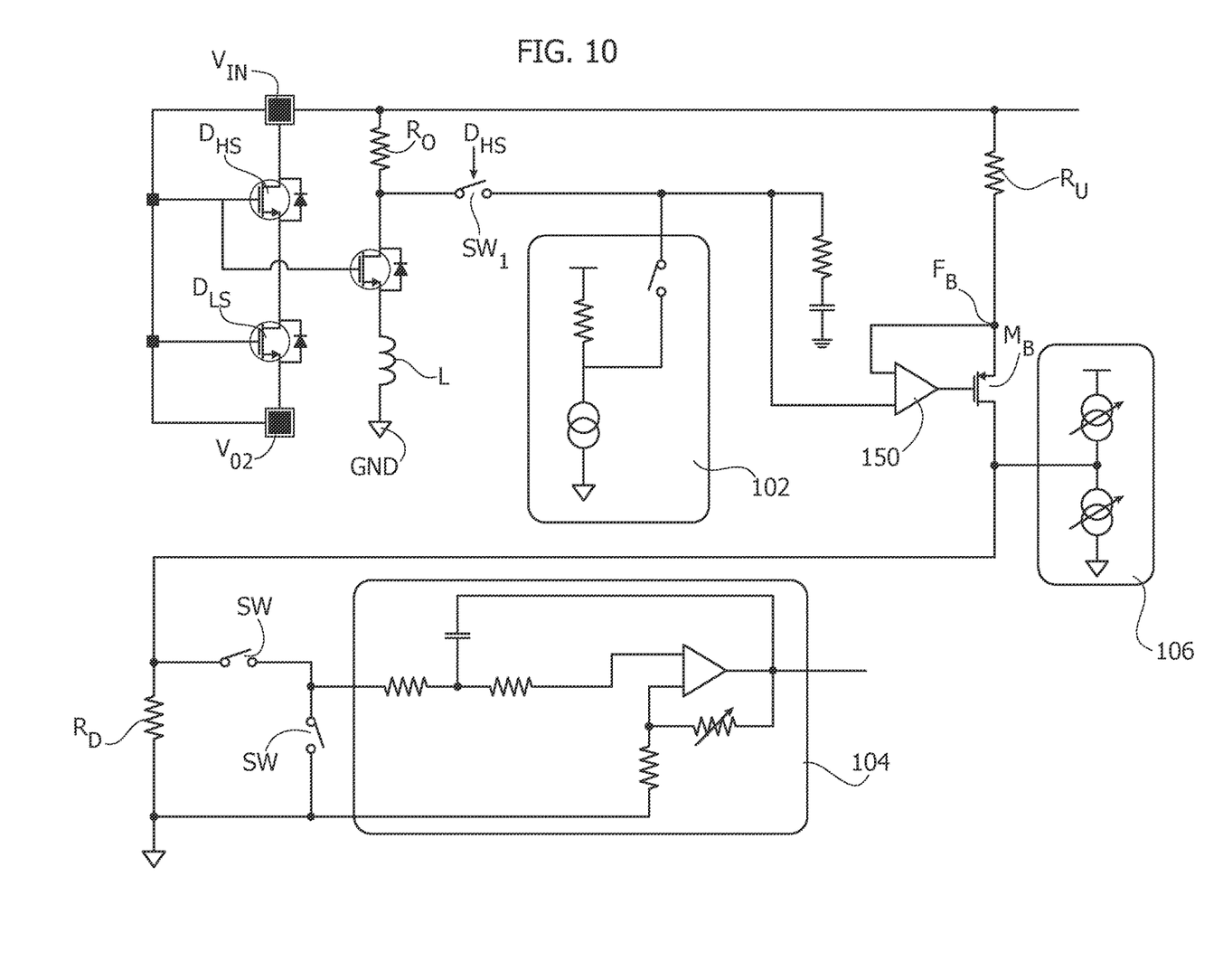
FIGS. 10 and 11 are exemplary diagrams of alternative embodiments of converter circuits as per the present disclosure.

Sensitivity and offset of the circuit exemplified in FIG. 7 can be tuned with an arrangement exemplified in FIG. 10. A skip mode circuit block 102 can facilitate adapting input dynamics for buffer 150. For instance, since in skip mode a drain-source voltage VDS of the high-side transistor HS could be too small to be replicated, an offset may be added to the input in order to reach an expected input level for the buffer input, while blocks 106 and 104 can be used to remove the offset at output, for instance. A low-pass filter circuit block 104 is coupled to the weighting circuit 18 in order to increase output swing, reduce impedance at the output $V_{SENSE}$ and improve measurement accuracy. An offset setting circuit block 106 comprises current generators configured to compensate DC error introduced by the buffer 150 (like the trimming circuit 19 exemplified in FIG. 6).

Figure 11:
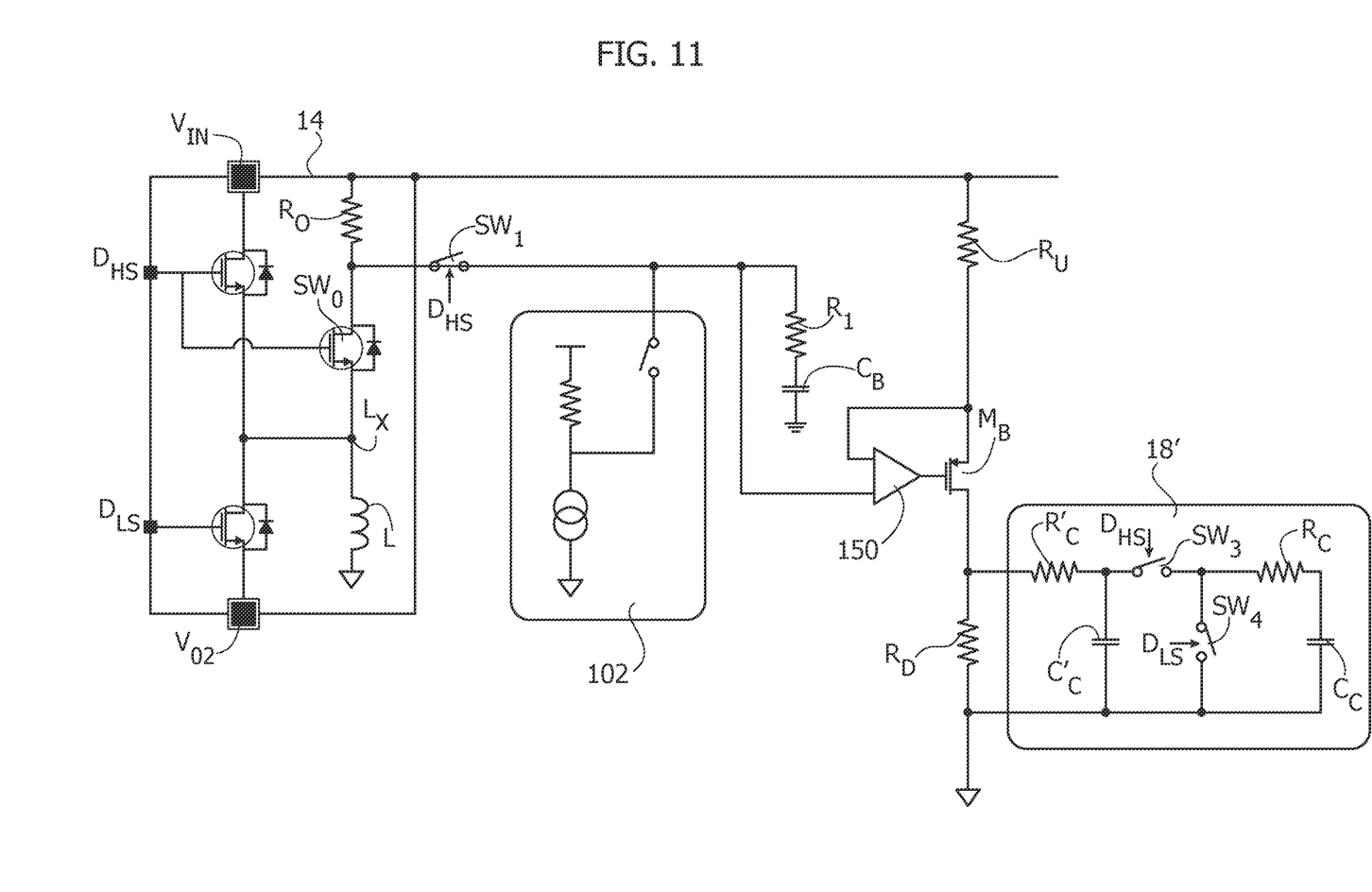

As exemplified in FIG. 11, the weighting circuit 18 can comprise a further RC network $R_C'$, $C_C'$ interposed between the resistance $R_D$ of the sensing circuit 15 and the third and fourth switches $SW_3$, $SW_4$. For instance, the further RC network $R_C'$, $C_C'$ is configured to further smooth measured $V_{SENSE}$ signal or to directly average it during second time-interval $T_{LS}$.

It is noted that, while discussed mainly with respect to the application context of AMOLED display panels DPs, the presented solution can be applied to virtually any kind of switching converter circuits.

In one or more embodiments, the method may be applied to measure also (e.g., in addition or in alternative) other currents in a DC-DC converter (e.g., switches and inductor) by sensing the current of a (single) switch.

In alternative embodiments, the signal $V_{RD}$ may be used to produce the sense signal $V_{SENSE}$ by applying filtering thereto, providing a measure of the input current.

In alternative embodiments, the voltage across the buffer capacitance $C_B$ in the RC circuit in block 16' as exemplified in FIG. 7 may be provided, e.g., as the weighted signal, to the buffer stage 150 of block 15.

As exemplified herein, a driver device (for instance, 10) is configured to generate a differential supply voltage (for instance, $V_{O1}$, $V_{O2}$) for a load between a first power supply rail (for instance, 100a) and a second power supply rail (for instance, 100b).

For instance, the driver device comprises: a first converter circuit (for instance, 12) coupled to the first supply rail, the first boost converter circuit configured to be operated in a continuous conduction mode, CCM; and a second converter circuit (for instance, 14) as per the present disclosure having said second node (for instance, $V_{O2}$) coupled to the load (for instance, DP) via the second rail (100b) in the pair of power supply rails, the second converter circuit configured to provide the weighted signal (for instance, $V_{SENSE}$) indicative of an intensity of a current (for instance, I, $I_{OUT}$) flowing through said load coupled to the second node (for instance, $V_{O2}$).

For instance, the driver device is configured to vary the differential supply voltage (for instance, $V_{O1}$, $V_{O2}$) generated for the load based on the weighted signal.

As exemplified herein, a system comprises a driver device as per the present disclosure and a load (e.g., a display panel, preferably an AMOLED display panel) coupled across the first power supply rail and the second power supply rail of the driver device to receive the differential supply voltage therefrom.

As exemplified herein, a method comprises providing a DC output signal (for instance, $V_{O2}$, $I_{OUT}$) to a user circuit (for instance, DP) via a converter circuit (for instance, 14) having a first node (for instance, $V_{IN}$) which receives an input signal from an energy source (for instance, 10), a second node (for instance, $V_{O2}$) which provides the DC output signal to the user circuit, and a third node (for instance, LX) coupled to an inductance (for instance, L) referred to ground, wherein the converter circuit includes a first electronic switch (for instance, HS) having a current flow path therethrough coupled intermediate the first node and the third node and a second electronic switch (for instance, LS) having a current flow path therethrough coupled intermediate the third node and the second node, the first electronic switch and the second electronic switch configured to be made selectively (for instance, $D_{HS}$, $D_{LS}$) conductive and non-conductive.

As exemplified herein, the method comprises operating the converter circuit: in a first operating state (for instance, $T_{HS}$), during which the first electronic switch is conductive and the second electronic switch is non-conductive, and in a second operating state (for instance, $T_{LS}$), during which the first electronic switch is non-conductive and the second electronic switch is conductive; sensing (for instance, $SW_0$, $R_0$, 15) a current ($I_L$) flowing in the current flow path through the first electronic switch made conductive during the first operating state to produce a sensing signal (for instance, $V_{HS}$, $V_{RD}$; $V^*_{RD}$) indicative of an intensity of the current flowing through the inductance; averaging (for instance, 16, 16') the sensing signal to produce an averaged sensing signal (for instance, $V_B$) indicative of an average value (for instance, $<I_L>$) of the intensity of the current flowing therethrough; and weighting (for instance, 18; 18') the averaged sensing signal by the time during which the second electronic switch is conductive, to produce a weighted signal (for instance, $V_{SENSE}$), the weighted signal indicative of an intensity of a current (for instance, I, $I_{OUT}$) provided to the user circuit via said second node.

As exemplified herein, the method comprises operating the converter circuit in a third operating state (for instance, $T_{IDLE}$) during which the first electronic switch and the second electronic switch are both non-conductive.

As exemplified herein, the method comprises averaging the sensing signal to produce the averaged sensing signal over an averaging time (for instance, $T_{HS}$, $T_{LS}$, $T_{IDLE}$, $T_{SW}$) where at least one of the first electronic switch and the second electronic switch is non-conductive.

As exemplified herein, a converter circuit (for instance, 14) comprises: a first node (for instance, $V_{IN}$) configured to receive an input signal from an energy source (for instance, 10); a second node (for instance, $V_{O2}$) configured to provide a DC output signal (for instance, $V_{O2}$, $I_{OUT}$) to a user circuit (for instance, DP); and a third node (for instance, LX) coupled to an inductance (for instance, L) referred to ground. A first electronic switch (for instance, HS) has a current flow path therethrough coupled intermediate the first node and the third node and a second electronic switch (for instance, LS) having a current flow path therethrough coupled intermediate the third node and the second node. Control circuitry (for instance, 20) coupled to the first electronic switch and the second electronic switch is configured to make the first electronic switch and the second electronic switch selectively (for instance, $D_{HS}$, $D_{LS}$) conductive and non-conductive in a first operation state, during which the first electronic switch is conductive and the second electronic switch is non-conductive, and a second operation state (for instance, $T_{LS}$), during which the first electronic switch is non-conductive and the second electronic switch is conductive. Sensing circuitry (for instance, $SW_0$, $R_0$, 15) is configured to sense the current flowing in the current flow path through the first electronic switch made conductive during the first operating state to produce a sensing signal indicative of the intensity of a current (for instance, $I_L$) flowing through said inductance (for instance, L). Averaging circuitry (for instance, 16; 16') is coupled to the sensing circuitry, wherein the averaging circuitry is configured to average the sensing signal to produce an averaged sensing signal (for instance, $V_B$) indicative of an average value (for instance, $<I_L>$) of the current (for instance, $I_L$) flowing through the inductance. Weighting circuitry (for instance, 18; 18') is coupled to the averaging circuitry, wherein the weighting circuitry is configured to weigh the averaged sensing signal by the time during which the second electronic switch is conductive, to produce a weighted signal (for instance, $V_{SENSE}$) indicative of the intensity of a current (for instance, I, $I_{OUT}$) provided to the user circuit via said second node (for instance, $V_{O2}$).

As exemplified herein, control circuitry is configured to make the first electronic switch and the second electronic switch both non-conductive in a third operating state (for instance, $T_{IDLE}$).

As exemplified herein, the averaging circuitry is configured to produce the averaged sensing signal over an averaging time where at least one of the first electronic switch and the second electronic switch is non-conductive.

As exemplified herein, the averaging circuitry comprises: a low-pass filter (for instance, $R_1$, $C_B$) configured to be activated (for instance, $SW_1$) to filter the sensing signal over a time (for instance, $T_{Hs}$) where the first electronic switch is conductive and the second electronic switch is non-conductive; and a buffer circuit (for instance, 160) configured to be coupled (for instance, $SW_2$) to the low-pass filter to buffer the filtered sensing signal over a time (for instance, $T_{LF}$, $T_{IDLE}$) where at least one of the first electronic switch and the second electronic switch is non-conductive.

As exemplified herein, the buffer circuit (for instance, 160) has a buffer gain, and the converter circuit comprises a resistive network (for instance, $R_2$, $R_3$, $R_4$, $R_5$) coupled to the buffer circuit and configured to adjust the buffer gain.

As exemplified herein, the sensing circuitry comprises: a respective buffer circuit (for instance, 150) having at least one input node configured to receive the sensing signal during a time (for instance, $T_{HS}$) in which the first electronic switch is conductive and the second electronic switch is non-conductive; and an output node (for instance, FB, $V_{RD}$). The respective buffer circuit is configured to provide the sensing signal at the output node at a time (for instance, $T_{LS}$, $T_{IDLE}$) during which at least one of the first electronic switch and the second electronic switch is made selectively non-conductive, the sensing signal at the output node having a DC error superimposed thereon. A resistance (for instance, $R_D$) is coupled to the output node of the respective buffer to receive the sensing signal therefrom and having a current flow therethrough. Trimming circuitry (for instance, 19) is coupled to the resistance and configured to remove said DC error superimposed on said sensing signal provided at said output node by varying the current flow through said resistance.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

The claims are an integral part of the technical teaching provided herein with reference to the embodiments.

Without prejudice to the underlying principles, the details and embodiments may vary, even significantly, with respect to what has been described by way of example only, without departing from the extent of protection. The extent of protection is defined by the annexed claims.

The invention claimed is:

1. A method, comprising:
operating a converter circuit, which includes a first electronic switch having a current flow path between a first node and a third node and a second electronic switch having a current flow path between the third node and a second node, wherein the third node is coupled to an inductance referred to ground, in a first operating state during which the first electronic switch is conductive and the second electronic switch is non-conductive and in a second operating state during which the first electronic switch is non-conductive and the second electronic switch is conductive;

sensing a current flowing in the current flow path of the first electronic switch during the first operating state to produce a sensing signal indicative of an intensity of the current flowing through said inductance;

averaging the sensing signal to produce an averaged sensing signal indicative of an average value of the intensity of the current flowing through said inductance, and weighting the averaged sensing signal by a time during which the second electronic switch is conductive in the second operating state to produce a weighted signal, wherein the weighted signal is indicative of an intensity of a current provided to a user circuit via said second node.

2. The method of claim 1, further comprising operating the converter circuit in a third operating state during which the first electronic switch and the second electronic switch are both non-conductive.

3. The method of claim 1, wherein averaging comprises averaging the sensing signal over an averaging time where at least one of the first electronic switch and the second electronic switch is non-conductive.

4. A converter circuit, comprising:
a first node configured to receive an input signal from an energy source;
a second node configured to provide a DC output signal to a user circuit;
a third node coupled to an inductance referred to ground;
a first electronic switch having a current flow between the first node and the third node;
a second electronic switch having a current flow path between the third node and the second node;
control circuitry coupled to the first electronic switch and the second electronic switch and configured to make the first electronic switch conductive and the second electronic switch non-conductive in a first operation state and further configured to make the first electronic switch non-conductive and the second electronic switch conductive in a second operation state;
sensing circuitry configured to sense the current flowing in the current flow path through the first electronic switch made conductive during the first operating state, wherein the sensing circuit is configured to produce a sensing signal indicative of the intensity of a current flowing through said inductance;
averaging circuitry coupled to the sensing circuitry, wherein the averaging circuitry is configured to average the sensing signal to produce an averaged sensing signal indicative of an average value of the current flowing through said inductance; and
weighting circuitry coupled to the averaging circuitry, wherein the weighting circuitry configured to weight the averaged sensing signal by a time during which the second electronic switch is conductive to produce a weighted signal indicative of the intensity of a current provided to the user circuit via said second node.

5. The converter circuit of claim 4, wherein the control circuitry is further configured to make the first electronic switch and the second electronic switch both non-conductive in a third operating state.

6. The converter circuit of claim 4, wherein the averaging circuitry is configured to produce said averaged sensing signal over an averaging time where at least one of the first electronic switch and the second electronic switch is non-conductive.

7. The converter circuit of claim 4, wherein the averaging circuitry comprises:
a low-pass filter configured to be activated to filter the sensing signal over a time where the first electronic switch is conductive and the second electronic switch is non-conductive; and
a buffer circuit configured to be coupled to the low-pass filter to buffer the filtered sensing signal over a time where at least one of the first electronic switch and the second electronic switch is non-conductive.

8. The converter circuit of claim 7, wherein the buffer circuit has a buffer gain, and the converter circuit comprises a resistive network coupled to the buffer circuit and configured to adjust the buffer gain.

9. The converter circuit of claim 4, wherein the sensing circuitry comprises:
a respective buffer circuit having at least one input node configured to receive the sensing signal during a time in which the first electronic switch is conductive and the second electronic switch is non-conductive; and
an output node;
wherein the respective buffer circuit is configured to provide the sensing signal at the output node at a time during which at least one of the first electronic switch and the second electronic switch is made selectively non-conductive.

10. The converter circuit of claim 9, wherein the sensing signal at said output node having a DC error superimposed thereon, and wherein the sensing circuitry further comprises:
a resistance coupled to the output node of the respective buffer circuit to receive the sensing signal therefrom and having a current flow therethrough; and
trimming circuitry coupled to the resistance and configured to remove said DC error superimposed on said sensing signal provided at said output node by varying the current flow through said resistance.

11. A driver device configured to generate a differential supply voltage for a load between a first power supply rail and a second power supply rail, the driver device comprising:
a first converter circuit coupled to the first supply rail, the first boost converter circuit configured to be operated in a continuous conduction mode (CCM); and
a second converter circuit according to claim 4 having said second node coupled to the load via the second rail in the pair of power supply rails, the second converter circuit configured to provide the weighted signal indicative of an intensity of a current flowing through said load coupled to the second node;
wherein the driver device is configured to vary the differential supply voltage generated for the load based on the weighted signal.

12. A system, comprising:
the driver device of claim 11; and
a load coupled across said first power supply rail and said second power supply rail of the driver device to receive said differential supply voltage therefrom.

13. The system of claim 12, wherein said load comprises a display panel.

14. The system of claim 13, wherein the display panel is an AMOLED display panel.

* * * * *